July 9, 1946.  J. F. LAUGHEAD  2,403,808
POWER-OPERATED EQUIPMENT FOR TRACTORS
Filed July 7, 1944   3 Sheets-Sheet 1
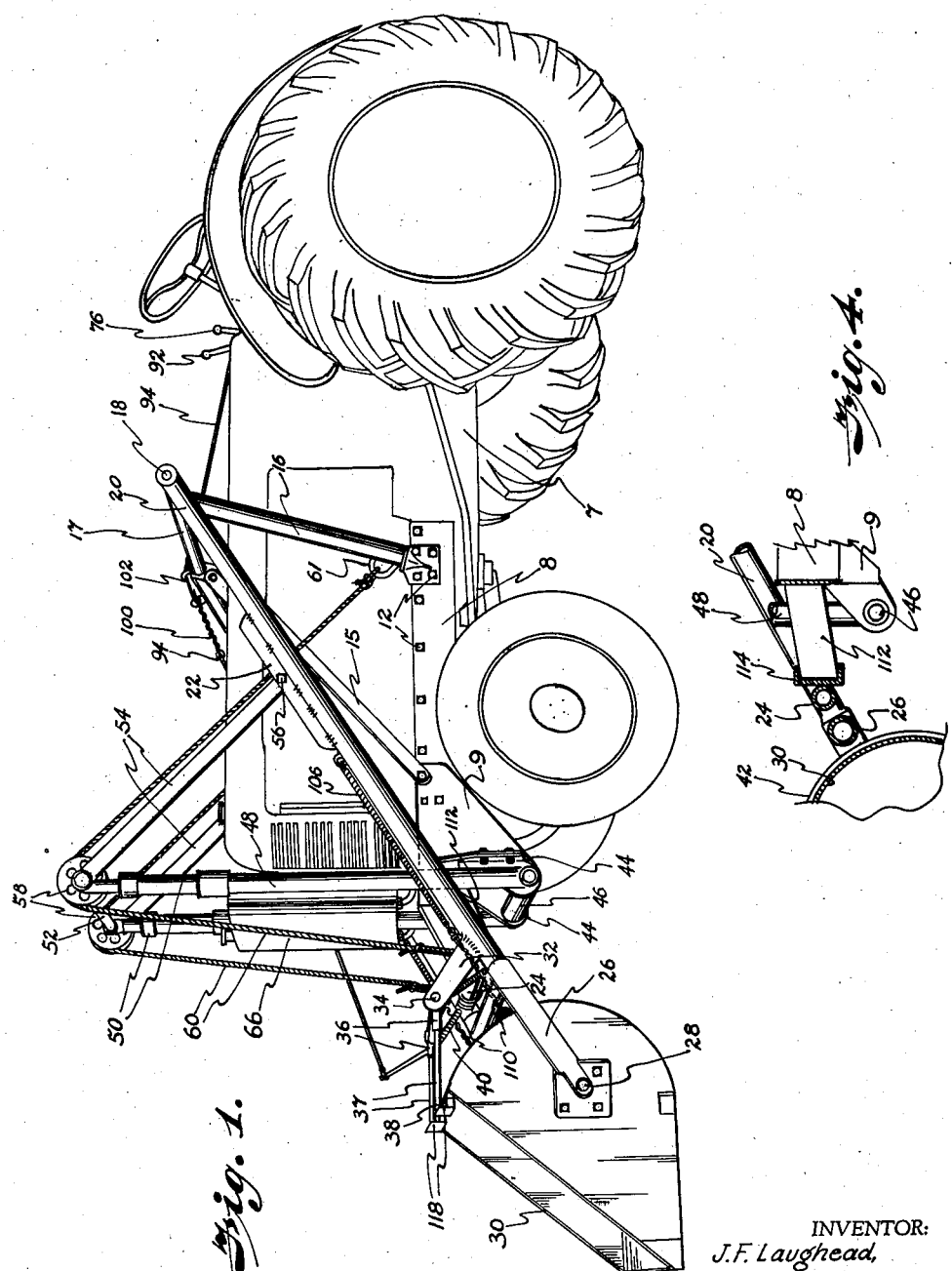
INVENTOR:
J. F. Laughead,
BY
Chas. O. Gerard
ATTORNEY.

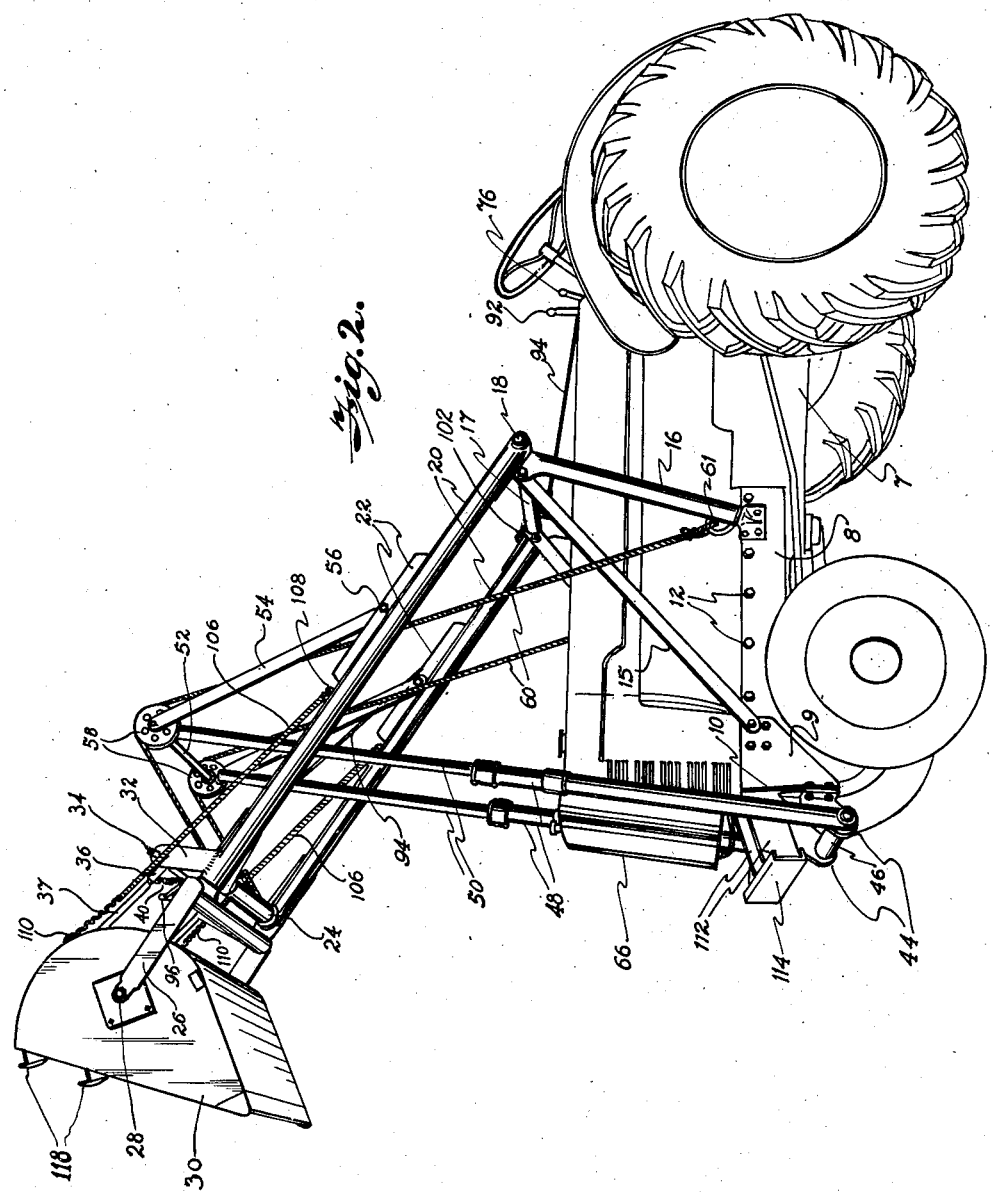

July 9, 1946.  J. F. LAUGHEAD  2,403,808
POWER-OPERATED EQUIPMENT FOR TRACTORS
Filed July 7, 1944  3 Sheets-Sheet 3
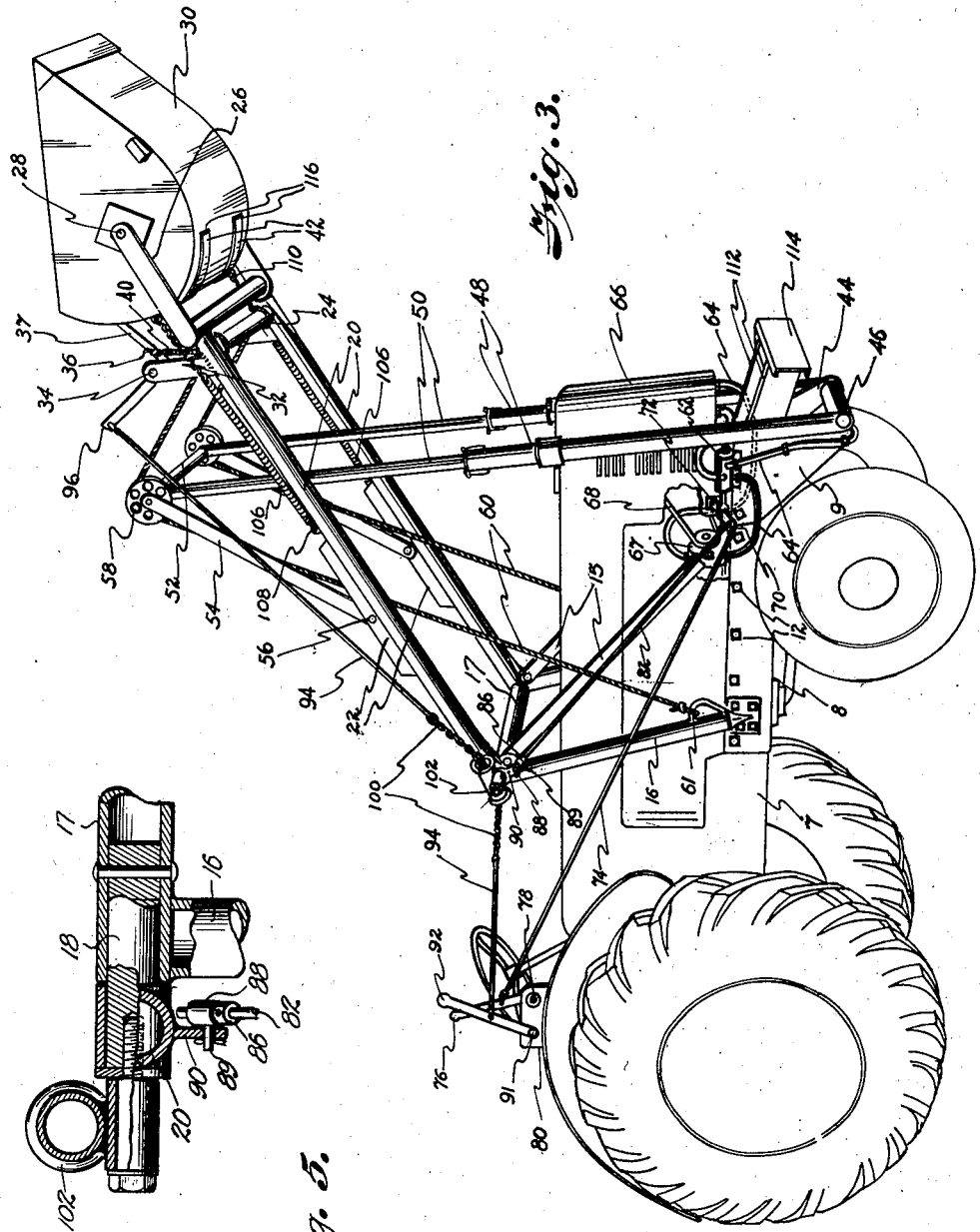
INVENTOR:
J. F. Laughead,
BY
ATTORNEY.

Patented July 9, 1946

2,403,808

UNITED STATES PATENT OFFICE 2,403,808

POWER-OPERATED EQUIPMENT FOR TRACTORS

James F. Laughead, Ottawa, Kans., assignor to Ottawa Steel Products, Incorporated, Ottawa, Kans., a corporation of Kansas Application July 7, 1944, Serial No. 543,887

4 Claims. (Cl. 214—140)

The present invention relates to apparatus for power-operated shovels and the like, with particular reference to apparatus suitable for operation in connection with farm tractor equipment, and aims to provide an improved and simplified and more economical construction of this character.

Accordingly I have devised a construction comprising practically a minimum amount of structural framework for supporting the operative elements of this type of power shovel equipment and suitable for ready and convenient application to a tractor unit, as well as of a sturdy character and very simple in its operation.

For accomplishing this purpose, I have devised an improved form of supplemental framework applicable to the tractor body and supporting hydraulic units designed to be operated from the tractor unit, together with pivotal shovel-carrying arms provided with cables operating over pulleys mounted at the upper ends of the hydraulic plunger members, whereby the arms and shovel are raised from loading to dumping position, in which operation provision is also made for automatically interrupting the raising or lifting movement as soon as the shovel has reached maximum dumping position.

It is also an object of the improvements to provide means for automatically latching the shovel in its dumping position, and thereafter also to automatically return the shovel (after its dumping movement and the release of said temporary latching means) to its original position where it is again automatically latched for reloading operation.

A further object of my improvements is to provide a bumper structure as a part of the framework and in such relation to the shovel-carrying means as to enable the tractor operation to impart operative thrusts more directly to the shovel through the medium of the tractor movements and independently of the raising and lowering means for the shovel.

With the foregoing general objects in view the invention will now be described more in detail by reference to the accompanying drawings, illustrating a very practical and highly efficient form of construction for embodying the proposed improvements, after which those features and combinations deemed to be novel and patentable will be particularly set forth and claimed.

In the drawings:

Figure 1 is a perspective view illustrating a tractor equipped with a power-operated shovel equipment, and constructed in accordance with the present invention;

Figure 2 is a similar view, but illustrating the position of the parts after the shovel has been operated into raised and dumping position;

Figure 3 is a view similar to Figure 2, but viewing the parts from the opposite side of the apparatus;

Figure 4 is a fragmentary detail view, showing the operative relation of the bumper structure to the shovel-carrying arms; and Figure 5 is an enlarged detail of the rocker shaft that carries the bucket latch rods and valve control.

Referring now to the said drawings in detail, the improvements are illustrated assembled in operative relation to a conventional type of tractor, by being secured to the chassis frame 7 of the tractor. Accordingly the base and securing means for mounting the equipment on the tractor comprises a fabricated framework made up of suitable side plates 8, front corner brackets 9 and transverse framework 10 connecting said brackets and all secured together and to said tractor frame 7 by bolts or equivalent fastening means 12.

At the rear end of each of the side plates 8 is secured (as by means of certain of the bolts 12) the lower end of a post 16 which is braced in rearwardly inclined position by means of a strut member 15 which is secured at its lower end to one of the corner brackets 9. At the upper end of each post is provided a pin 18 for fulcruming the rear end of a shovel-carrying arm 20 having the strengthening ribs 22; and the other forward ends of the arms 20 are connected by a crosspiece 24, and also have secured thereto a yoke member 26 having pivotal connections (as indicated at 28) to the opposite sides of the scoop or shovel member 30.

These outer ends of the arms 20 also carry fixed brackets 32 for fulcruming a rocker shaft 34 which is provided with a pair of socket arms 36 for adjustably mounting a pair of latch rods 37 having hook-ends 38 adapted for latching engagement with the upper rear edge of the shovel 30 when in the latching position illustrated in Figures 2 and 3. These latch rods are actuated by coil springs 40 to maintain said hook-ends engaged with the shovel, the lower ends of said springs being anchored to fixed points on the shovel raising and lowering means. In the swinging movements of the shovel, the hook-ends 38 of the latch rods ride over wear strips 42 attached to the rear face of the shovel as shown in Figure 3.

At the front corners of the base or supporting framework, the same is provided with brackets 44 serving to fulcrum a cross member 46 carrying a pair of hydraulic cylinders 48, in which operate the rams or plunger rods 50 having their upper ends connected by a cross arm 52; and the outer ends of said cross arm are pivotally connected with the ends of brace members 54 the opposite ends of which are fulcrumed (as indicated at 56) to the shovel-carrying arms 20 at some distance to the front of the posts 16. At the ends of the cross arm 52 are also journaled a pair of pulleys 58 with which are engaged suitable cables 60 having their front ends secured to the cross piece 24 and their rear ends fastened (as indicated at 61) to the lower ends of the posts 16.

The hydraulic means for operating the shovel-lifting arms comprises a valve 62 with hose connections 64 both to the lower ends of the cylinders 48 and an oil supply tank 66, as well as to a suitable pumping unit 67 located inside the engine case and provided with an appropriate drive connection 68 actuated from the engine in a manner common to apparatus of this type.

The valve 62 is controlled by an operating lever 70 pivoted at 72 and provided with an operating link 74 connecting with a hand lever 76 which is fulcrumed at 78 on a bracket plate 80 convenient to the driver's position. Moreover the lever 70 is also provided with an operating link 82 for automatically shutting off the operation, said link 82 extending rearwardly and having its rear end provided with a stop collar 86 adapted for engagement by a sleeve 88 slidingly mounted on the link and swiveled at 89 to a fixed arm or lug rigid with the rear end of one of the shovel-lifting arms 20, whereby in the raised position of the latter the sleeve 88 is automatically engaged with the collar 86 and thus actuates the link 82 in a direction to close the valve 62 and shut off the operative flow of the hydraulic fluid.

Adjacent to the lever 76 is also fulcrumed a hand lever 92 provided with an operating connection to a lever 96 which is rigid with the rocker shaft 34 carrying the latch rods 37; the front section of the operating rod 94 is connected with the rear rod section 94 by a short length of chain 100 adapted for flexible operative movement through a flaring sleeve or tube 102 suitably attached to the top of the adjacent upright or post 16.

Each of the shovel-carrying arms 20 is provided with a strong spring 106 secured to the arm at one end as indicated at 108, and at its other end to the rear of the shovel by means of a short chain 110 having an adjustable connection with the spring for varying the spring action, the combined action of said springs being sufficient to rotate the empty shovel, after dumping, back into its original latched position.

The cross piece 10 is provided with a pair of brackets 112 carrying a bumper plate 114; and when the shovel-lifting arms 20 are in lowered position, the cross member 24 connecting said arms 20 comes directly against said bumper plate 114, thus facilitating the operation of said bumper structure as a ram in cooperation with the movements of the tractor for driving the shovel with corresponding force into the material to be loaded into the shovel.

This position of the apparatus, just referred to, is the shovel-loading position as shown in Figure 1, in which position the shovel 30 is latched by the hook-ends 38 of the latch rods 37. As the shovel is loaded by the movements of the apparatus, in advancing the the shovel into the material, the shovel-carrying arms are largely relieved of the driving thrusts, due to the provision of the bumper structure which is located directly in position for receiving such thrusts and transmitting same to the heavy tractor frame.

In this loading operation, it is to be noted that the arrangement and construction of the apparatus are such as to afford the operator a clear view of the operating movements, there being no heavy framework or connections to obstruct his vision around the front of the machine.

When the shovel has been loaded, the operator, by means of the lever 76 opens the valve 62, which admits the hydraulic fluid to the cylinders 48, thereby operating the plunger rods 50 to raise the shovel-lifting arms through the medium of the cables 60 and thus elevating the shovel into its raised or dumping position as represented in Figures 2 and 3. On reaching this position the said valve 62 is automatically operated through the described connections (including the rod 82 and the operating member 90) to throw the valve into neutral position and shut off the hydraulic fluid, thereby causing the shovel to remain stationary while it is dumped by the operator's throwing the lever 92, which disengages the hook-ends 38 of the latch rods from the rear edge of the shovel. This releases the shovel to the automatic dumping action of the load, the center of gravity of which is in front of the shovel pivots 28, so that the shovel rocks against the action of the springs 106; and as the shovel executes this dumping movement, the hook-ends 38 of the latch rods ride against the wear strips 42 and on over the ends of said strips into engagement with shoulders or stops 116, whereby the shovel is in effect propped by the latch rods in its dumping position until the material is completely discharged therefrom. In this position the springs 106 are under such a tension that when the operator again operates the latch lever 92 for releasing latch rods from said stop shoulders 116, the action of said springs 106 is strong enough to cause the shovel to execute a complete reverse movement back into its original latched position, with the hook ends 38 of the latch rods re-engaged with the rear edge of the shovel, a pair of stop elements 118 being carried by said rear edge of the shovel to act as abutments for said hook ends 38 and thus limit the reverse swing of the shovel in its return to relatching position.

At this juncture the operator again operates the valve 62 by means of lever 76 to release the hydraulic fluid from the cylinders 48 and thus allow all the parts carried by the plunger rods 50 to settle down automatically into lowered or initial shovel-loading position, as illustrated in Figure 1.

It will thus be apparent that I have devised a practical and highly efficient apparatus of the character described, having provision for quick and convenient attachment to a conventional tractor without requiring any change or modification of any sort in the design of such tractor construction itself; and when thus installed the operator is enabled to supervise all the necessary operations of loading and dumping the shovel without obstruction of his view by any bulky or heavy types of framework between him and the points of operation. The described arrangement and construction afford not only a relatively simple and inexpensive but also very compact and sturdy power-operated equipment adapted to meet the requirements of practically any range of operating conditions.

While I have illustrated and described what I have found to represent a suitable form of embodiment of my proposed improvements, I wish to be understood as reserving the right to make such changes and modifications as may fall within the scope of my invention as defined by the following claims.

Having thus described my invention, what I claim and desire to secure by Letters Patent is:

1. Apparatus for power shovels and the like comprising, in combination with a tractor body, a supplemental frame for attachment to the front end of said tractor body, stationary posts secured to said frame at the sides of said body, shovel-carrying arms fulcrumed upon the upper ends of said posts and provided with cables attached to the free ends of said arms and also to the lower ends of said posts, hydraulic cylinders pivotally supported at the front end of said frame and provided with plunger rods carrying pulleys engaging said cables, bracing and supporting means connecting said plunger rods with said shovel-carrying arms, a shovel pivotally supported by the free ends of said arms, and valve-controlled hydraulic connections to the lower ends of said cylinders.

2. Apparatus for power shovels and the like comprising, in combination with a tractor body, a supplemental frame for attachment to the front end of said tractor body, stationary posts at the sides of said tractor body, arms pivotally connected with the upper ends of said posts, hydraulic cylinders pivotally mounted on the front end of said frame and provided with plunger rods carrying pulleys at their upper ends, cables operating over said pulleys and attached to said arms and also to the lower ends of said posts, pivotal bracing and supporting members connecting said arms with the upper ends of said plunger rods, a shovel pivotally supported by the free ends of said arms, and valve-controlled hydraulic connections to the lower ends of said cylinders.

3. Apparatus for power shovels and the like comprising, in combination with a tractor body, a supplemental frame for attachment to the front end portion of said tractor body, stationary posts at the sides of said tractor body, arms pivotally connected with the upper ends of said posts, hydraulic cylinders pivotally mounted on the front end of said frame and provided with plunger rods having a cross rod connecting their upper ends, pivotal bracing and supporting members connecting said arms with the outer ends of said cross rod, cables connecting the free ends of said arms with the lower ends of said posts, pulleys mounted on the ends of said cross rod in engagement with said cables, and valve-controlled hydraulic connections to the lower ends of said cylinders.

4. Apparatus for power shovels and the like comprising, pivotally mounted shovel-carrying arms, a shovel pivotally carried by the free ends of said arms, pivoted latch elements adapted to engage the mouth of the shovel to latch the same in loaded position, and wear-strips on the rear face of the shovel for engagement by said latch elements during the dumping movement of the shovel, said wear-strips terminating in shoulders for engagement by said latch elements for temporarily retaining the shovel in its dumping position.

JAMES F. LAUGHEAD.